United States Patent
Mezaael

(10) Patent No.: US 11,663,861 B2
(45) Date of Patent: May 30, 2023

(54) SYSTEM FOR DETERMINING CONNECTED VEHICLE PARAMETERS

(71) Applicant: FORD GLOBAL TECHNOLOGIES, LLC, Dearborn, MI (US)

(72) Inventor: Abraham Mezaael, Southfield, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 554 days.

(21) Appl. No.: 16/700,569

(22) Filed: Dec. 2, 2019

(65) Prior Publication Data

US 2021/0166504 A1    Jun. 3, 2021

(51) Int. Cl.
| | |
|---|---|
| G07C 5/08 | (2006.01) |
| G07C 5/00 | (2006.01) |
| H04L 67/104 | (2022.01) |
| H04L 12/40 | (2006.01) |

(52) U.S. Cl.
CPC ........... G07C 5/0808 (2013.01); G07C 5/008 (2013.01); G07C 5/085 (2013.01); H04L 12/40156 (2013.01); H04L 67/104 (2013.01); H04L 2012/40215 (2013.01); H04L 2012/40273 (2013.01); H04L 2212/00 (2013.01)

(58) Field of Classification Search
None
See application file for complete search history.

(56) References Cited

U.S. PATENT DOCUMENTS

| | | | |
|---|---|---|---|
| 9,299,198 B2 | 3/2016 | Chronowski et al. | |
| 2005/0137786 A1* | 6/2005 | Breed | G08G 1/163 |
| | | | 701/482 |
| 2010/0188201 A1* | 7/2010 | Cook | G07C 5/0808 |
| | | | 340/439 |
| 2013/0204515 A1* | 8/2013 | Emura | G08G 1/052 |
| | | | 701/119 |
| 2013/0325250 A1* | 12/2013 | Cawse | G07C 5/0808 |
| | | | 701/33.1 |
| 2015/0178578 A1 | 6/2015 | Hampiholi | |
| 2016/0110929 A1* | 4/2016 | Park | G07C 5/008 |
| | | | 709/227 |
| 2019/0026962 A1* | 1/2019 | Gintz | G07C 5/008 |
| 2021/0023944 A1* | 1/2021 | Ravichandran | B60K 23/0808 |

* cited by examiner

*Primary Examiner* — Jenkey Van
(74) *Attorney, Agent, or Firm* — Joseph Zane; Brooks Kushman, P.C.

(57) ABSTRACT

A vehicle data system may include an onboard diagnostic port configured to receive a request for a threshold relating to a vehicle parameter, the threshold indicating a limit in a standard operating range of the vehicle parameter, and a processor configured to receive the request for the threshold, receive vehicle data from at least one vehicle component, and apply a filter to the vehicle data to generate a tuned threshold for the requested threshold based on an initial value and the vehicle data.

13 Claims, 3 Drawing Sheets

SYSTEM FOR DETERMINING CONNECTED VEHICLE PARAMETERS

TECHNICAL FIELD

Disclosed herein are systems for determining connected vehicle parameters.

BACKGROUND

Vehicles often include a variety of parameters as well as onboard diagnostic data for various vehicle systems. This data may be available by accessing a vehicle controller area network (CAN) bus via an onboard diagnostic (OBD) port. The OBD port may allow third parties, such as mechanics, to pull data from the vehicle. This data may include certain vehicle conditions such as engine speed, vehicle speed, braking aggressiveness, etc.

SUMMARY

A vehicle data system may include an onboard diagnostic port configured to receive a request for a threshold relating to a vehicle parameter, the threshold indicating a limit in a standard operating range of the vehicle parameter, and a processor configured to receive the request for the threshold, receive vehicle data from at least one vehicle component, and apply a filter to the vehicle data to generate a tuned threshold for the requested threshold based on an initial value and the vehicle data.

A method for vehicle diagnostic system may include receiving a request from an offboard device for a threshold, receiving vehicle data from at least one vehicle component, applying a filter to the vehicle data to generate a tuned threshold for the requested threshold based on an initial value for the requested threshold and the vehicle data, and transmitting the tuned threshold to offboard device.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
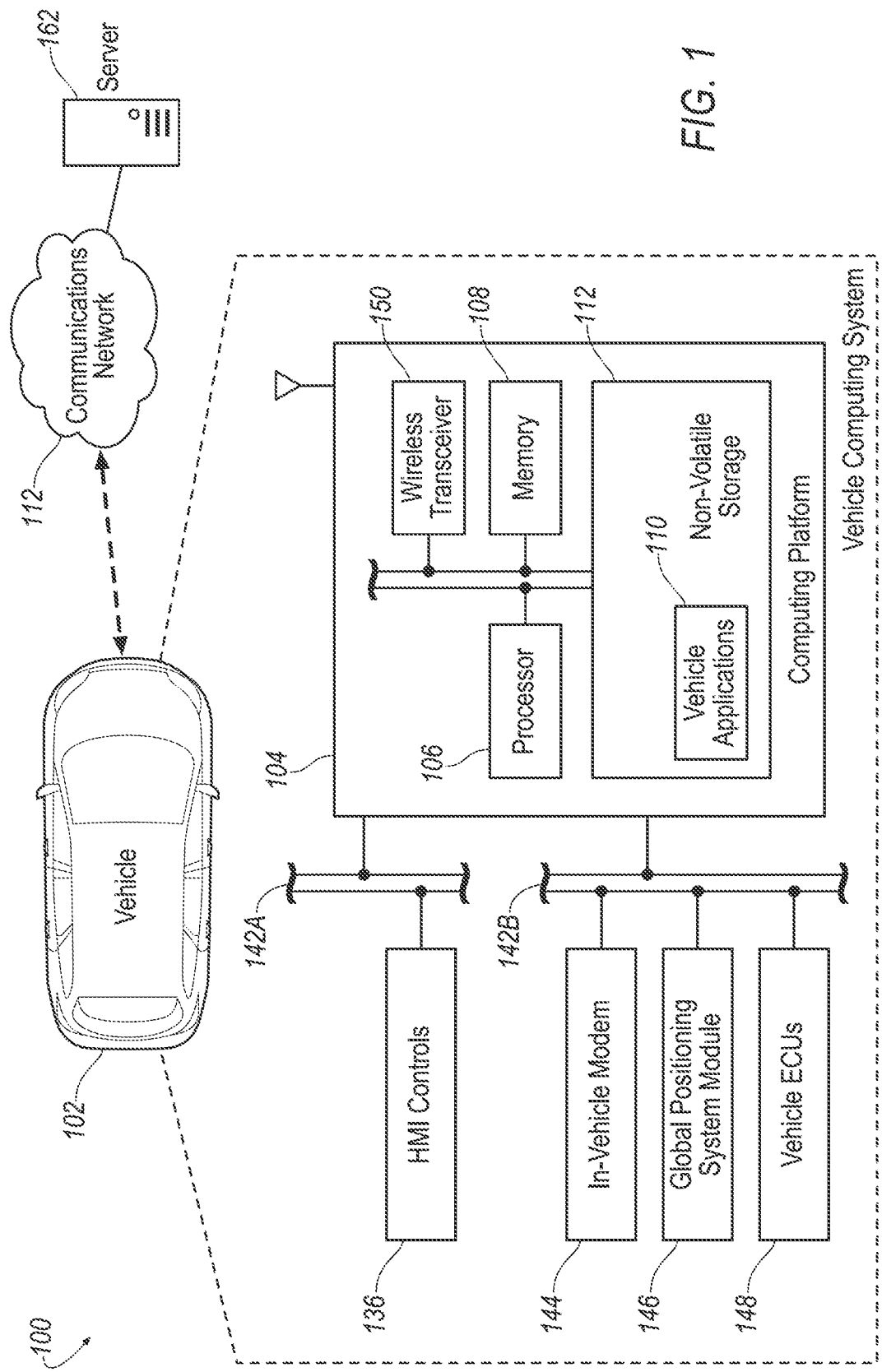
FIG. 1 illustrates an example diagram including a vehicle configured to access telematics servers and a mobile device having a platoon subscription application.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various models of vehicles vary significantly during operation. For example, a pick-up truck may operate at a higher average RPM than that of a sedan. Even within a certain vehicle type, different trim models and packages may cause for discrepancies from one vehicle to another. The standard operating ranges for various vehicle characteristics may therefore vary. When vehicle data is pulled, such as vehicle characteristics and parameters, including, engine speed, vehicle speed, brake activation, acceleration, etc., this vehicle data, if not compared with appropriate thresholds or used with respect to the specific vehicle model, may incorrectly lead to assumed deficiencies or defects of the vehicle.

For example, while 4000 RPMs might be excessive for a light duty truck, it is a common engine speed for a high-performance vehicle. Devices configured to record a standard set of data may read a high engine speed (e.g., in excess of a threshold maximum value) in a high-performance vehicle as "bad performance," when that speed is typical for such a vehicle and actually appropriate. In some situations, the vehicle identification number (VIN) is used to apply thresholds specific to that vehicle type. These thresholds may be maintained in an external server.

However, due to the large amount of effort and research that may be required to establish such thresholds, these thresholds are often unknown and not defined or stored in a database or server. Further, vehicle upgrades such as engine performance upgrades, differentials systems, suspension updates, tire upgrades, throttles, horse power upgrades, etc., may impact the known connected vehicle data thresholds such as hard braking, hard acceleration, hard cornering, fuel economy, etc. To even further complicate these thresholds are the various vehicle modes that the vehicle may selectively operate in, such as sport, sport+, economy, comfort, all-wheel drive, four-wheel drive, deep condition, race, slippery, etc. These modes may require further tuning of certain thresholds to indicate accurate vehicle performance.

Disclosed herein is a vehicle controller or electronic control unit (ECU) including a filter, such as an Extended Kalman Filter (EKF) to generate a tuned threshold for connected vehicles based on an initial value and vehicle data. The filter may tune certain thresholds in order for the vehicle data to be applicable and accurate on a specific VIN. The filter may provide an improved system for proper modeling to acquire appropriate thresholds for the vehicles features with respect to the current vehicle, driveline, system, and components. Based on specific vehicle and connected data, the controller may determine appropriate actions and inputs, such as assessing which vehicle modules contain the specified data. The controller may pass inputs to the filter with an initial state and compute and normalize the data with respect to the vehicle feature, architecture and baseline. The tuned threshold may be stored in the vehicle memory, as well as in the external server so as to be attainable by other similarly situated vehicles. This system allows for high precision, low costs, high instantaneity, and the like.

FIG. 1 illustrates an example system 100 including a vehicle 102 configured to access telematics servers. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants to interface with the computing platform 104. The computing platform 104 may be further configured to communicate with other components of the vehicle 102 via one or more in-vehicle networks 142. The in-vehicle networks 142 may include one or more of the CAN, an Ethernet network, and a media-oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 (or global navigation satellite system (GNSS) configured to provide current vehicle 102 location and heading information, and various vehicle ECUs 148 configured to incorporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

Figure 2:
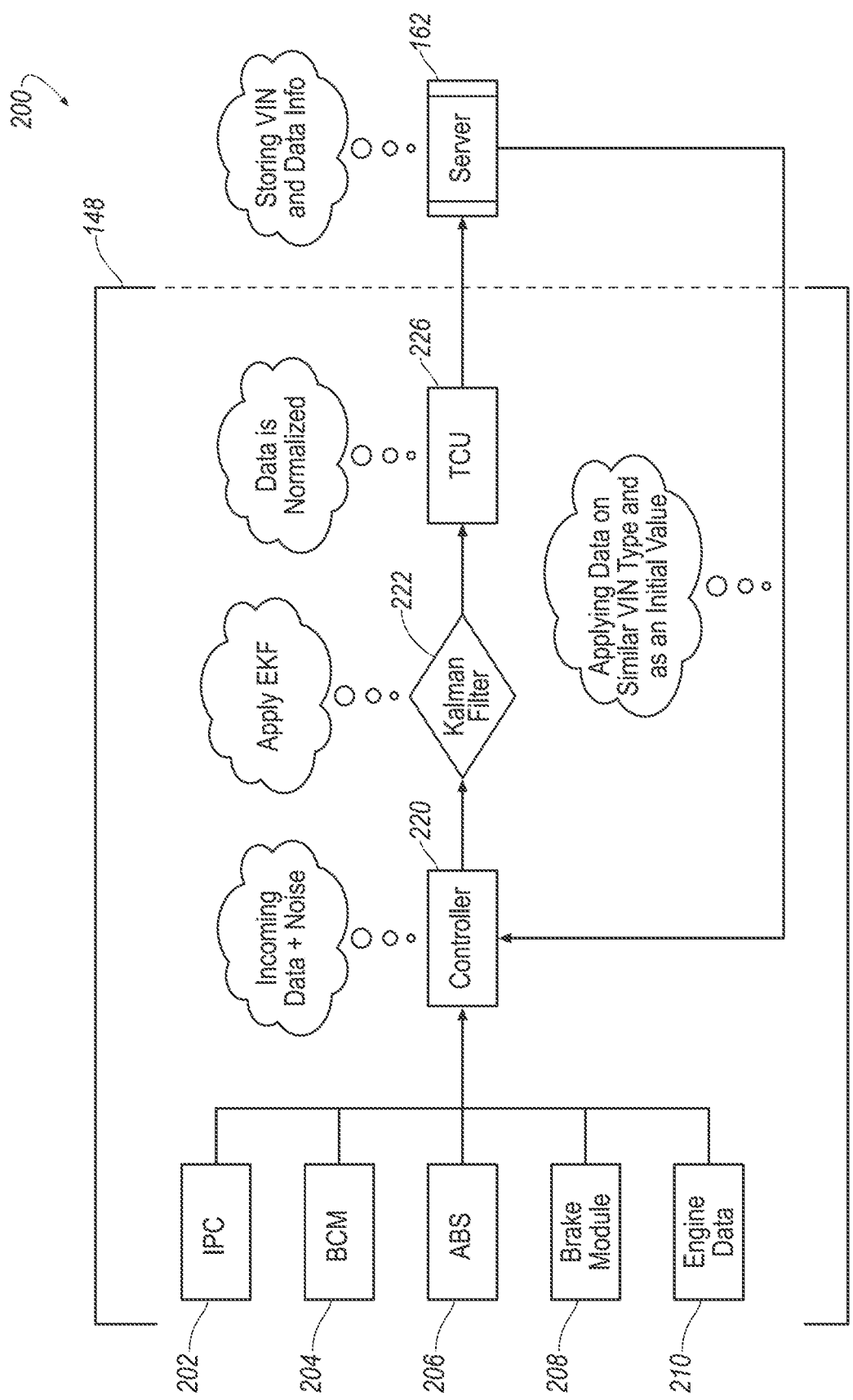
FIG. 2 illustrates a block diagram of an example threshold determination system.

The communications network 156 may provide communications services, such as packet-switched network services (e.g., Internet access, VoIP communication services), to devices connected to the communications network 156. An example of a communications network 156 may include a cellular telephone network FIG. 2 illustrates a block diagram of an example threshold determination system 200. The system 200 may include the vehicle ECU 148, or another special purpose controller. As explained above, the ECU may include various vehicle ECUs 148 configured to incorporate with the computing platform 104 (illustrated in FIG. 1). In addition to the example ECUs identified above, the system 200 may include additional ECUs, such as an instrument panel cluster (IPC) 202, a body control module (BCM) 204, an antilock brake system (ABS) 206, a brake module 208, and an engine system 210. The ECU 148 may also include a controller 220, a Kalman filter 222, and a telematics control unit (TCU) 224.

The IPC 202 may be part of the vehicle dashboard and may include certain displays and present information to the vehicle occupants. For example, the IPC 202 may include a speedometer, tachometer, fuel level, engine coolant temperature, trip odometer, vehicle odometer, lights including blinker and bright status, etc. The IPC 202 may be configured to display certain alerts or warnings to the driver.

The BCM 204 may manage various power control functions such as exterior lighting, interior lighting, keyless entry, remote start, and point of access status verification (e.g., closure status of the hood, doors and/or trunk of the vehicle 102) etc.

The ABS 206 may include an automated system for avoiding skid-braking. This system may receive an indicated of harsh braking from the vehicle brake system, as well as acceleration. The brake module 208 may similarly provide brake information to the controller 220.

The engine system 210 may provide engine data such as rotations per minute (rpm), torque, and other engine related data. The engine system 210 may also provide the engine type such as EV, PHEV, PEV, etc.

The controller 220 may be a controller separate from the other ECUs or may be combined with one or more of the same. The controller 220 may receive the vehicle data from the respective ECUs. The controller 220 may interface with the ECUs and the TCU 224 to tune thresholds relating to the specific vehicle. Such tuning may be done within the vehicle 102 to decrease unauthorized access to the vehicle data.

The controller 220, upon receiving a request for at least one threshold, may apply a filter 222 to the received vehicle data. Once the filter 222 has been applied, the controller 220 may transmit the tuned threshold to the TCU 224. The controller 220 may receive vehicle data from vehicle components such as the ECUs. The controller 220 may also receive server data from the server 162. The server data may include data retrieved from a vehicle database within the server 162. The vehicle database may maintain vehicle data related to vehicle 102, as well as other vehicles, fleets, etc. The server 162 may catalog the vehicles by their respective VINs and store data associated therewith so as to streamline data collection and threshold determination. For example, the vehicle database may maintain a list of thresholds for each vehicle. The thresholds may then be used by the controller 220 for further tuning, or in lieu of tuning if the threshold has been previously determined and satisfies the received threshold request.

The controller 220 may also detect trigger events. Trigger events may be events that have an affect on certain thresholds. For example, an update to an engine module may have an effect on the RPM threshold. Thus, if the server 162 has a stored RPM threshold for the vehicle 102, but since determining that RPM threshold a subsequent trigger event has been recognized, a new tuned threshold may be required. Although RPM is used as example threshold, other thresholds such as electric vehicle ranges and fuel economy may also be impacted by a trigger event.

The stored RPM threshold, however, may still be used by the controller as an initial value for the tuning. The RPM threshold may be further and iteratively refined to generate a new tuned threshold. The initial value may be stored locally within the vehicle memory or externally on the server 162.

The trigger events may include upgrades to the vehicle 102 such as engine performance upgrades, power control module updates, other the air updates, etc. Other trigger events may include updates to the transmission, brake pads, differentials, acceleration, suspension, rotors, shifters, throttle response, horse power, tire type and size, etc. A driving condition change or mode change such as sport, sport plus, economy, comfort, etc., may also be recognizes by the controller as a trigger event. Ideally, the controller 220 may eventually calculate and tune a threshold for each of these driving modes or states and store the tuned threshold for each associated mode in the vehicle memory and/or sever 162.

The TCU 224 may be an embedded system onboard the vehicle 102 that allows the vehicle 102 to connect to the telematics servers and communicate with devices outside of the vehicle, such as the server 162. The TCU 224 may communicate with the server 162 to receive additional vehicle data, as well as to transmit the tuned thresholds to the server 162. Upon receiving the tuned thresholds, the server 162 may in turn use the threshold for future vehicles, as well as future tuning.

Figure 3:
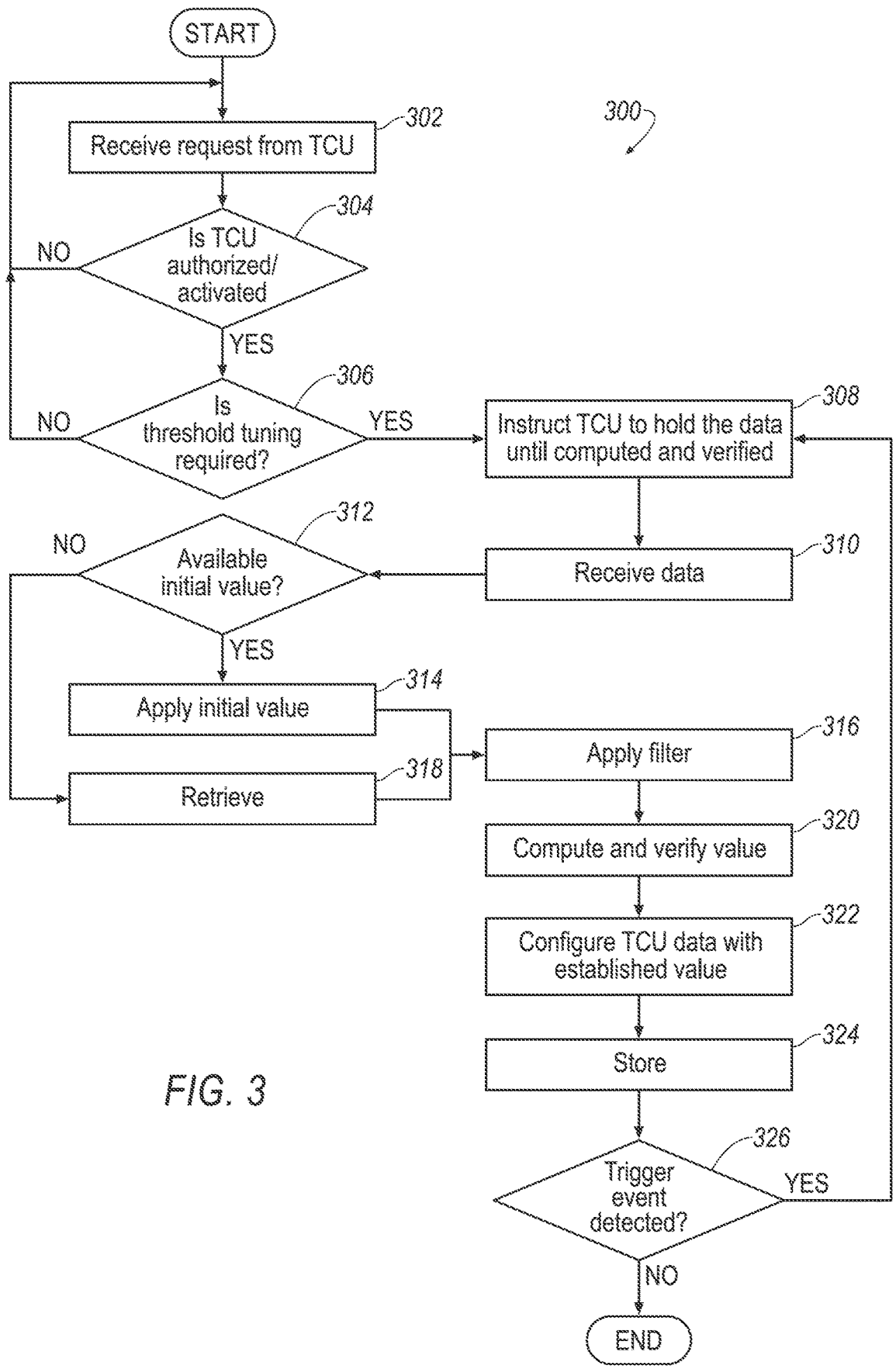
FIG. 3 illustrates an example flow chart of a process for the threshold determination system.

FIG. 3 illustrates an example flow chart of a process 300 for the threshold system 200. The process 300 may begin at block 302 with the controller 220 receiving a request from the TCU 224. The request may be initiated from the OBD port. For example, and external device may be connected to the OBD in order to gain vehicle data relating to possible maintenance of the vehicle. In one example, the request may be for an appropriate RPM threshold for the vehicle 102.

At block 304, the controller 220 may determine whether the TCU 224 is authorized or activated. Authorization may be considered the initial authorization between the server 162 and the vehicle, for example, upon purchase of the vehicle 102 for subscription to a connected vehicle feature. Authorization may also include granting permission based on the off-board device being authorized to receive vehicle data. If the TCU 224 is authorized, the process 300 proceeds to block 306. If not, the process 300 returns to the start to await another request, or ends. If the TCU 224 is not authorized, the process 300 may cease since further tuning is not necessary as no data is to be transmitted to the network or through the OBD port.

At block 306, the controller 220 may then determine whether the requested threshold requires threshold tuning. The controller 220 may determine whether threshold tuning is necessary by determining whether the threshold being requested is stored or has been previously determined. The requested threshold may be stored in either the vehicle memory or on the server 162 and may be associated with the VIN. The controller 220, via the TCU 224, may verify whether the requested threshold is stored in the server 162. If the controller 220 determines that the threshold is stored, the process 300 ends. If the controller 220 determines that the threshold is not stored, and therefore needs to be determined, the process 300 proceeds to block 308.

At block 308, in response to the determination that the requested threshold is to be determined, the controller 220 may transmit a hold message to the TCU 224. The hold message may instruct the TCU 224 to hold all data until the requested threshold is calculated and verified. That is, the TCU 224 is not to transmit any data, such as RPM data, to the OBD port until the threshold has been determined. This may also include instructing the TCU 224 to transmit an "in progress" message to the OBD port and/or server to indicate that the controller 220 is in the process of gathering the appropriate threshold.

At block 310, the controller 220 may receive vehicle data. This may include data from each of the IPC 202, BCM 204, ABS 206, brake module 208, and engine system 210. The controller 220 may also receive server data from the server 162. The server data may include data relating to the vehicle, or a specific type of vehicle. The server data may also relate to vehicle fleet data, including fleet averages, other thresholds determined for other vehicles in the fleet, etc.

At block 312, the controller 220 may determine whether an initial value for the requested threshold is available. This initial value may be an initial RPM value stored in the vehicle memory. If an initial value is available, the process 300 proceeds to block 314. If not, the process 300 proceeds to block 318.

At block 314, the controller 220 may apply the initial value to the filter 222.

At block 318, the controller 220 may retrieve an initial value. This initial value may be derived from server data of related or similar vehicles to that of the vehicle 102. For example, the initial value may be the RPM value for a truck of similar trim line and model, or similar make, year, etc.

At block 316, the controller 220 may apply the filter 222 to the received data and initial value. The filter 222, as explained, may be an EKF. The filter may use inputs including the power control module data, driver driving data and metadata, related data such as throttle pressing for engine rev, as well as the RPM values generated during vehicle operation. More or less data may be used by the filter, and the prior listing are simply examples.

At block 320, the controller 220 may compute and verify the tuned threshold. This may include applying the EKF and determining value gain, noise, and errors. The filter may be re-run for multiple iterations in order to achieve a more accurate tuned threshold. The tuned threshold may be validated to confirm it is applicable. This may include the TCU 224 running a check to verify that the tuned threshold is within a certain range. For example, if the tuned threshold comes in at 10,000 RPMs, but a typical range for the threshold is 4,000-6,000 RPMs, the TCU 224 may not validate the threshold. In one example, the tuned threshold may be 5500 RPMs.

At block 322, the controller 220 may transmit the tuned threshold to the TCU 224 and instruct the TCU 224 to set the RPM threshold to the tuned threshold (e.g., excessive RPM with 5500 RPM for the truck). The TCU 224 may then monitor the vehicle RPM and compare the RPM to the tuned threshold. The TCU 224 may report connected vehicle data relating to the RPM. This may be reported to the server 162 or via the OBD port.

At block 324, the controller 220 may store the tuned threshold within the vehicle memory or the vehicle computing system for future use as an initial value as described above in block 314. The controller 220 may also instruct the TCU 224 to transmit the tuned threshold to the server 162.

The server 162 may store the tuned threshold and associate the threshold with the VIN. The server 162 may allow for further usage of the threshold as an initial value as described in block 314, or for other requested thresholds for other similar vehicles.

At block 326, the controller 220 will determine whether a trigger event has been detected. As described above, a trigger event may be an event that may alter or impact the requested threshold. For example, a trigger may include an upgrade to engine performance, updated power control module, over the air updates, or other trigger that may affect vehicle performance. If a trigger event is detected, the process 300 proceeds to back to block 308. If not, the process 300 ends.

While the process and examples herein refer to an RPM threshold, this is simply an example. Other thresholds may be determined by applying the filter 222 to an initial value, including but not limited to fuel economy and EV range. Vehicle modifications and performance upgrades may alter and require updated thresholds. These modifications may include engine and transmission upgrades, the addition of racing brake pads, differentials for acceleration upgrades, suspensions, rotors, updated shifters, throttle response, horse power, tire type and size, etc. Each of these modifications may be a trigger as described with respect to block 330 and may have a significant impact on the tuned threshold.

Other forms of trigger events may include changing vehicle modes, such as sport, sport plus, economy, comfort, all-wheel drive, four-wheel drive, deep condition, race, slippery, etc. The process 300 may compute and store appropriate thresholds for each mode and associate these values for ease of use in future calculation and responding to future threshold requests. These values may be stored within the vehicle 102, but may also be stored within the server 162. Furthermore, fleet vehicles may be updated and modified to meet the demand or requirements of the general fleet. Thus, accurate thresholds are important for reporting purposes, especially fuel economy, in these examples. The system may also be applicable to police and emergency vehicles.

Autonomous vehicles may further appreciate the disclosed system, especially with frequent software updates to and upgrades. By verifying and continually updating the thresholds in response to a trigger event, even unrealized upgrades may be accounted for.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle data system, comprising:
an onboard diagnostic port configured to receive a request for a threshold relating to a vehicle parameter, the threshold indicating a limit in a standard operating range of the vehicle parameter;
a processor configured to
receive the request for the threshold;
receive vehicle data from at least one vehicle component; and
in response to recognizing a trigger event, apply a filter to the vehicle data to generate a tuned threshold for the requested threshold based on an initial value and the vehicle data, wherein the trigger event includes a changing of a vehicle mode.

2. The system of claim 1, wherein the processor is further configured to store the tuned threshold within a vehicle memory.

3. The system of claim 1, wherein the trigger event includes a vehicle engine upgrade.

4. The system of claim 1, wherein the processor is configured to apply the filter in response to authenticating a telematics controller from which the request for the threshold is received.

5. The system of claim 1, wherein the processor is configured to retrieve the initial value from an off-board server maintaining a database of vehicle identification numbers (VINs) and associated initial values.

6. The system of claim 5, wherein the processor is configured to retrieve the initial value based on the associated VIN having at least one of a same vehicle model as that of the request for the threshold.

7. The system of claim 1, wherein the processor is further configured to transmit instructions to a telematics controller to store the tuned threshold at an off-board server.

8. The system of claim 1, wherein the filter is an estimated Kalman filter.

9. The system of claim 1, wherein the processor is further configured to query an offboard server to determine whether the threshold has been previously determined.

10. A method for vehicle diagnostic system, comprising:
receiving, at an onboard diagnostic port, a request from an offboard device for a threshold, the threshold indicating a limit in a standard operating range of a vehicle parameter;

receiving vehicle data from at least one vehicle component;

recognizing a trigger event, wherein the trigger event includes a vehicle engine upgrade;

in response to the trigger event, applying a filter to the vehicle data to generate a tuned threshold for the requested threshold based on an initial value for the requested threshold and the vehicle data;

transmitting the tuned threshold to offboard device.

11. The method of claim 10, further comprising storing the tuned threshold within a vehicle memory.

12. The method of claim 10, further comprising retrieving the initial value from an off-board server maintaining a database of vehicle identification numbers (VINs) and associated initial values.

13. The method of claim 10, further comprising transmitting instructions to a telematics controller to store the tuned threshold at an off-board server.

* * * * *